(12) United States Patent
Zaveri (10) Patent No.: US 9,038,111 B2
(45) Date of Patent: May 19, 2015

(54) SMART CHANNEL TUNING

(75) Inventor: Sagar Bankim Zaveri, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/301,397

(22) Filed: Nov. 21, 2011

(65) Prior Publication Data

US 2013/0128126 A1  May 23, 2013

(51) Int. Cl.
*H04N 5/50* (2006.01)
*H04N 21/466* (2011.01)

(52) U.S. Cl.
CPC .................................. *H04N 21/466* (2013.01)

(58) Field of Classification Search
CPC ........................................................ H04N 5/50
USPC ...................... 725/57, 109, 118; 1/1; 348/564; 382/229
See application file for complete search history.

(56) References Cited

U.S. PATENT DOCUMENTS

2008/0066111 A1* 3/2008 Ellis et al. ........................ 725/57

\* cited by examiner

*Primary Examiner* — Jeffrey Harold
*Assistant Examiner* — Sihar Karwan
(74) *Attorney, Agent, or Firm* — Ingrassia Fisher & Lorenz, P.C.

(57) ABSTRACT

A receiver receives channel selection related information. The receiver determines to switch to presenting content being received from a provider. Such switching may involve powering on the receiver and/or switching from other operations that do not present received content. The receiver selects a channel based at least one the information and transmits content associated with the selected channel to a presentation device. In various implementations, the information may be received from the content provider, from a user, by monitoring accessed content, and so on. In some implementations, the information may include data specifying a particular channel to select, a commonly accessed channel to select, a characteristic of commonly accessed content that may be used to select a channel associated with content with a similar characteristic, a particular specified characteristic that may be used to select a channel associated with content with a similar characteristic, and so on.

19 Claims, 5 Drawing Sheets

SMART CHANNEL TUNING

FIELD OF THE INVENTION

This disclosure relates generally to content presentation, and more specifically to a content receiver selecting content associated with a particular channel out of multiple possible channels for presentation when the content player switches to present content associated with one of the multiple possible channels based on information received by the content player.

SUMMARY

The present disclosure discloses systems and methods for smart channel tuning. A content receiver may receive at least one instance of channel selection related information. The content receiver may determine to switch to presenting at least one of a plurality of instances of content being received from one or more content providers that are each associated with one of a plurality of channels. Such switching may involve powering on the content receiver and/or switching from performing any operation that does not present content being received to presenting content being received. The content receiver may select one of the plurality of channels based at least one the instance of channel selection related information and transmit content associated with the selected channel to one or more presentation devices.

In various implementations, the channel selection related information may be received from one or more content providers. In other implementations, the channel selection related information may be received from one or more users in the form of user specified preferences. In still other implementations, the channel selection related information may be received by monitoring content that is accessed utilizing the content receiver. In yet other implementations, the channel selection related information may be received via a combination of a plurality of the preceding sources.

In some implementations, the channel selection information may include data specifying a particular specified channel to select. In other implementations, the channel selection information may include data specifying a commonly accessed channel to select. In still other implementations, the channel selection information may include data specifying a characteristic of commonly accessed content that may be used to select a channel associated with content with a similar characteristic. In yet other implementations, the channel selection information may include data specifying a particular specified characteristic that may be used to select a channel associated with content with a similar characteristic. In additional other implementations, the channel selection information may include data specifying a combination of a plurality of the preceding items. Further, in some implementations, the channel selection information may specify a particular time period or other selection condition that may be satisfied before the data included in the channel selection related information is utilized in selecting a channel.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Content receivers (such as set top boxes, television receivers, digital video recorders, television tuners, digital music players, desktop computers, laptop computers, cellular telephones, smart phones, mobile computing devices, and so on) may present content via one or more presentation devices (such as computer monitors, televisions, cathode ray tube displays, liquid crystal displays, speakers, printers, and/or other such devices for presenting content). The content that such content receivers may present may be stored by the content receiver and/or may be received from one or more content providers (such as one or more television programming providers, video on demand providers, pay per view movie providers, digital music providers, and so on) via one or more communication links (such as one or more satellite communication links, coaxial cable communication links, WiFi communication links, Internet protocol communication links, and so on).

Some content receivers may receive content from one or more content providers by selecting one or more instances of content from multiple instances of content that are each associated with one of multiple channels and transmitting the selected one or more instances of content to the presentation device. For example, a set top box may receive a multi-frequency signal from a satellite television provider that includes multiple television programs associated with a group of multiple television channels wherein each frequency of the multi-frequency signal carries data for a number of the television programs. The set top box may select a channel associated with a particular television program, tune to the frequency that carries the data for the particular television program, ignore any data carried in that frequency that does not relate to the particular program, process the data for the particular program, and transmit the processed data to a television in order to present the television program.

In some cases, when such content receivers switch to presenting content being received that is associated with a channel of the multiple channels (such as upon "powering on," switching to presenting the content being received from presenting stored content, and so on), the content receivers default to the last channel that was previously accessed. For example, a user may utilize a content receiver to access content being received associated with channel 71 and "powers off" the content receiver (or otherwise switches away from content being received, such as switching to presenting stored content). The user may then "power on" the content receiver again (or otherwise switches back to content being received, such as switching back from presenting stored content). In response, the content receiver may default to presenting content associated with channel 71 as channel 71 is the last channel that was previously accessed by the content receiver. In other cases, such content receivers may default to a particular channel (such as channel 0) when switching to presenting content that is being received. In either case, the default channel may simply be an option to select in the absence of any indication of what channel a user desires and the user may then be able to specify the channel that the user actually wants to access content associated with.

However, such default approaches do not provide much flexibility in presenting content to users. The fact that a channel was the last channel accessed does not necessarily mean that a user will want to access that channel when the content receiver later switches to content being received. A channel selected by default in this fashion may neither be a channel that a user wishes to access content associated with nor a channel which is associated with content that the content provider wishes to influence the user to access.

The present disclosure discloses systems and methods for smart channel tuning. A content receiver may receive at least one instance of channel selection related information. Such channel selection related information may be received from one or more content providers, from one or more users in the form of user specified preferences, by monitoring content that is accessed utilizing the content receiver, and/or any other way of receiving channel selection related information. The content receiver may determine to switch to presenting at least one of a plurality of instances of content being received from one or more content providers that are each associated with one of a plurality of channels. The content receiver may select one of the plurality of channels based at least one the instance of channel selection related information and transmit content associated with the selected channel to one or more presentation devices.

Figure 1:
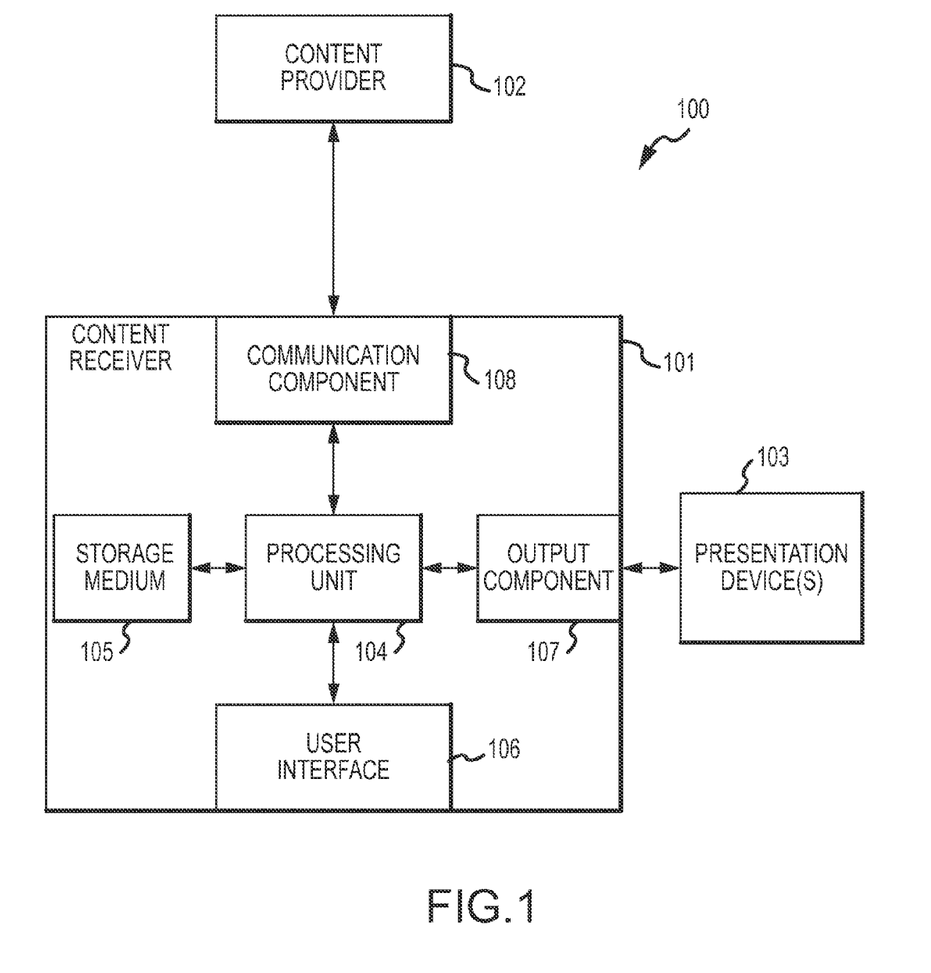
FIG. 1 is a block diagram illustrating a system for smart channel tuning.

FIG. 1 is a block diagram illustrating a system 100 for smart channel tuning. The system 100 includes a content receiver 101, one or more content providers 102, and/or one or more presentation devices 103. The content receiver may be any kind of content receiver such as a set top box, a television receiver, a digital video recorder, a television tuner, a digital music player, a desktop computer, a laptop computer, a cellular telephone, a smart phone, a mobile computing device, and/or any other kind of device that receives content. The content provider may be any kind of content provider such as one or more television programming providers, video on demand providers, pay per view movie providers, digital music providers and/or any other entity that provides content to the content receiver via one or more communication links (such as one or more satellite communication links, coaxial cable communication links, WiFi communication links, Internet protocol communication links, and/or any other communication link that can be utilized to transmit content from the content provider to the content receiver). The presentation device may be any kind of presentation device such as one or more computer monitors, televisions, cathode ray tube displays, liquid crystal displays, speakers, printers, and/or other such devices for presenting content.

The content receiver 101 may be configured to operate in a number of different states. The content receiver may operate in a "non-power" state when the content receiver is not receiving any power and may perform no operations when operating in the non-power state. When the content receiver is receiving power but has not yet received an instruction to "power on," the content receiver may operate in a "standby" state. In the standby state, the content receiver may communicate with one or more content providers and/or perform other background and/or maintenance tasks, but may not present content via the presentation device 103. When the content receiver receives instructions to power on, the content receiver may operate in a "power on" state in which the content receiver may provide content via the presentation device and/or perform other operations that the content receiver is configured to perform.

The content receiver 101 may include one or more processing units 104, one or more non-transitory storage media 105 (which may take the form of, but is not limited to, a magnetic storage medium; optical storage medium; magneto-optical storage medium; read only memory; random access memory; erasable programmable memory; flash memory; and so on), one or more user interface components 106, one or more output components 107, and/or one or more communication components 108. The processing unit may execute instructions stored in the non-transitory storage medium to receive content from the content provider 102 via the communication component, store received content in the non-transitory storage medium, and/or present stored content and/or content being received by transmitting the content to the presentation device 103 via the output component. The processing unit may perform one or more of these operations in response to user input received via the user interface component (which may be any kind of user interface such as one or buttons, keys, remote control interfaces, and/or any other device for receiving user input).

The content receiver 101 may determine to switch to presenting one or more instances of content out of a plurality of instances of content that are each associated with one of a plurality of channels being received from the content provider 102. In some cases, the content receiver may determine to switch to presenting the one or more instances of content being received as part of powering on. In other cases, the content receiver may determine to switch to presenting the one or more instances of content being received as part of switching from performing operations other than presenting the one or more instances of content, such as presenting one or more instances of stored content.

When the content receiver 101 determines to switch to presenting the one or more instances of content being received, the content receiver may select one or more of the channels based on one or more instances of channel selection information stored in the non-transitory storage medium 105. The instance of channel selection information may include data received from the content provider 102, data obtained by the content receiver monitoring content that is accessed via the content receiver, user preference data received from one or more users, other such data, and/or a combination of these data items. The instance of channel selection information may include data specifying a particular specified channel to select, a commonly accessed channel to select, a characteristic of commonly accessed content that may be used to select a channel associated with content with a similar characteristic, a particular specified characteristic that may be used to select a channel associated with content with a similar characteristic, and so on. Further, the instance of channel selection information may specify a particular time period or other selection condition that may be satisfied before the data included in the channel selection related information is utilized in selecting a channel. The content receiver may select the channel and transmit one or more instances of content associated with the selected channel to the presentation device 103 via the output component 107.

The content receiver 101 may occasionally (such as in response to the occurrence of a trigger event such as receipt of user input specifying to present content), periodically (such as every twenty minutes), and/or continuously monitor content that is accessed via the content receiver. The content receiver may compile access statistics based on the access and may record such access statistics in the instance of channel selection information stored in the non-transitory storage medium 105. Such statistics may include a variety of different information regarding accessed content such as channels associated with accessed content, characteristics of accessed content (which may be determined utilizing electronic programming guide information or other sources of content characteristics), user identity associated with the access, time information regarding when content is accessed, and/or any other kind of information about the accessed content.

For example, a user may utilize the content receiver 101 to most frequently access action movies. The content receiver may monitor these accesses and may record statistics the instance of channel selection information stored in the non-transitory storage medium 105 indicating that the user frequently accessed content with an action movie characteristic. When the content receiver determines to switch to presenting the one or more instances of content being received, the content receiver may select a channel that is associated with content that has an action movie characteristic.

Further, the content receiver 101 may occasionally (such as in response to the occurrence of a trigger event such as receipt of a transmit statistics command transmitted by the content provider 102), periodically (such as every ten minutes), and/or continuously transmit such statistics to the content provider. The content provider may receive such statistics from various content receivers and may group such statistics into statistics for one or more subscriber groups, geographic locations, neighborhoods, cities, countries, regions, time periods, other such groupings and/or a combination of these groups. The content provider may then occasionally (such as in response to the occurrence of a trigger event such a data request from the content receiver), periodically (such as every fifteen minutes), and/or continuously transmit such statistics to the content receiver. The content receiver may then store these group statistics received from the content provider in the instance of channel selection information stored in the non-transitory storage medium 105.

For example, more subscribers of the content provider 102 may be accessing channel 12 than any other channel at a given time. The content provider may receive this information and may transmit it to the content receiver 101. When the content receiver determines to switch to presenting the one or more instances of content being received, the content receiver may select channel 12 as being associated with the most popular content at the given time.

Additionally and/or alternatively, the content provider 102 may transmit other channel selection information to the content receiver. Such other information may include one or more suggested channels, such as channels for which the content provider has received a sponsorship offer (such as advertising revenues offered to the content provider in exchange for recommending a particular channel at a particular time). The content receiver may then store this information received from the content provider in the instance of channel selection information stored in the non-transitory storage medium 105.

For example, an entity associated with a program may pay the content provider 102 to recommend the channel associated with the program during the air time of the program. The content provider may transmit a specification of the channel for the air of the program to the content receiver 101. When the content receiver determines to switch to presenting the one or more instances of content being received during the air time of the program, the content receiver may select the specified channel.

The content receiver 101 may receive input from a user via the user interface 106 to record one or more user preferences in the instance of channel selection information stored in the non-transitory storage medium 105. As such, the content receiver 101 may present one or more menus that prompt user to enter such user preferences. Such user preferences may specify channels to select, categories of channels to select (such as channels associated with content that has a particular user specified content rating (such as content with a PG rating), channels associated with content of a particular type such as sports and/or movies, and/or any other type of category), characteristics to examine when selecting channels, rules about how to process different data (such as access statistics, group statistics or other information received from the content provider 102, characteristics or channels specified by user preferences, and so on) when selecting channels, and/or any other user specified data regarding channel selection.

For example, a user may specify via the user interface 106 (which may be in response to a menu presented by the processing unit 104 prompting the user to enter smart tuning user preferences) to always select channel 42 when the content receiver 101 determines to switch to presenting the one or more instances of content being received. Based on the user input, the content receiver may store this user preference in the instance of channel selection information stored in the non-transitory storage medium 105. Subsequently, when the when the content receiver determines to switch to presenting the one or more instances of content being received, the content receiver may select channel 42.

By way of another example, a user may specify via the user interface 106 (which may be in response to a menu presented by the processing unit 104 prompting the user to enter smart tuning user preferences) to combine access statistics with group statistics received from the content provider 102 when selecting a channel. Based on the user input, the content receiver may store this user preference in the instance of channel selection information stored in the non-transitory storage medium 105. Access statistics monitored by the content receiver and stored in the instance of channel selection information stored in the non-transitory storage medium 105 may indicate that the user most frequently watches programs having a police drama characteristic. Group statistics transmitted by the content provider may specify which shows are currently the most commonly accessed by subscribers of the content provider. As such, when the when the content receiver determines to switch to presenting the one or more instances of content being received, the content receiver may utilize the access statistics and the group statistics as directed by the user preferences to select the channel associated with the currently most accessed police drama program.

By way of a third example, a user may specify via the user interface 106 (which may be in response to a menu presented by the processing unit 104 prompting the user to enter smart tuning user preferences) to select a channel associated with a sports category when the content receiver 101 determines to switch to presenting the one or more instances of content being received. Based on the user input, the content receiver may store this user preference in the instance of channel selection information stored in the non-transitory storage medium 105. Subsequently, when the when the content receiver determines to switch to presenting the one or more instances of content being received, the content receiver may select a channel that is associated with content that corresponds to a sports category.

Figure 2:
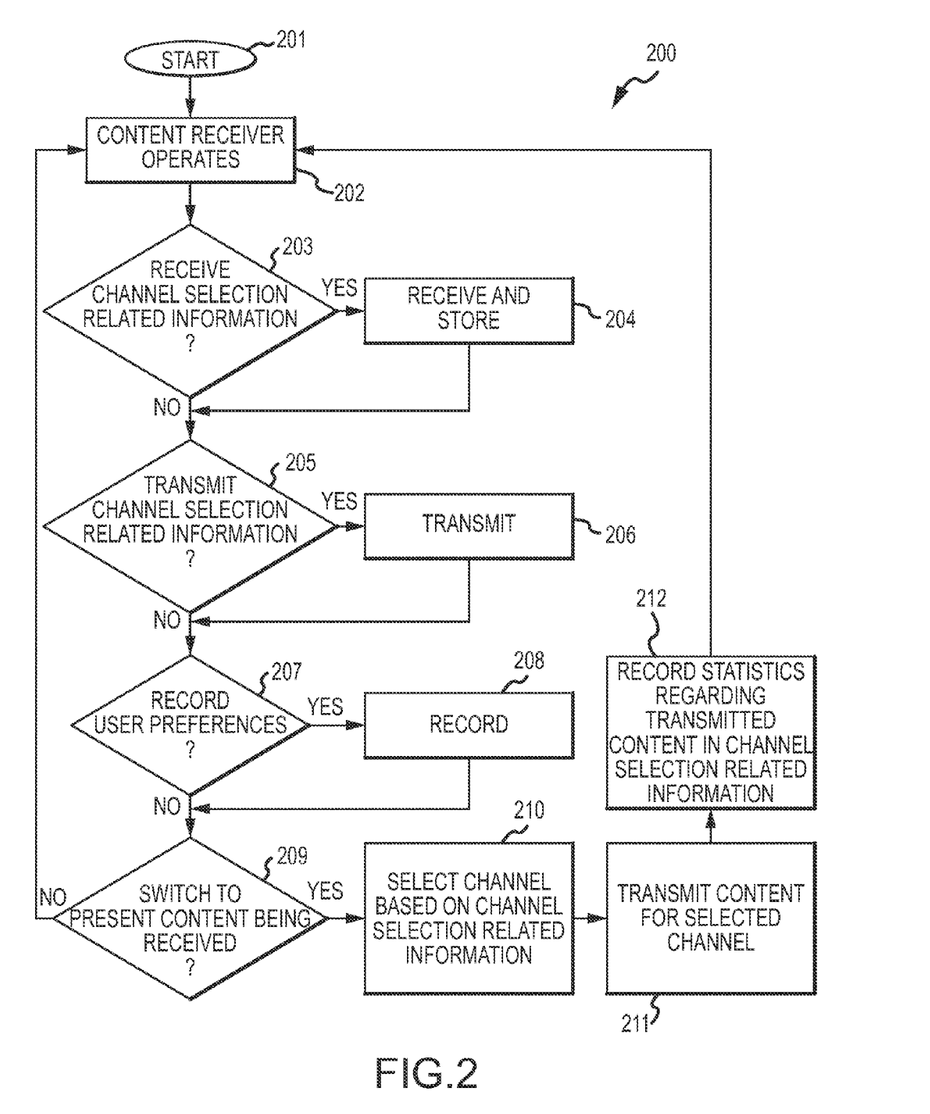
FIG. 2 is a flow chart illustrating a method for smart channel tuning. This method may be performed by the system of FIG. 1.

FIG. 2 illustrates a method 200 for smart channel tuning. The method 200 may be performed by the content receiver 101 of FIG. 1. The flow begins at block 201 and proceeds to block 202 where the content receiver 101 operates. Operation of the content receiver may include operation in a standby state, a powered on state, or any other state where the content receiver receives power and performs one or more operations. The flow then proceeds to block 203 where the processing unit 104 may determine whether or not the content receiver receives channel selection information. In some cases, such channel selection information may be received from the content provider 102 via the communication component 108. In other cases, the channel selection information may be received from a user via the user interface. In yet other cases, the channel selection information may be received by the processing unit monitoring content accessed via the content receiver. In still other cases, the channel selection information may be received by a combination of the above methods. If so, the flow proceeds to block 204 where the channel selection information is received and stored in the non-transitory storage medium 105 before the flow proceeds to block 205. Otherwise, the flow proceeds directly to block 205.

At block 205, the processing unit 104 may determine whether or not to transmit statistics gathered by monitoring content accessed via the content receiver 101 to the content provider 102. If so, the flow proceeds to block 206 where the statistics are transmitted to the content provider before the flow proceeds to block 207. Otherwise, the flow proceeds directly to block 207.

At block 207, the processing unit 104 may determine whether or not to record one or more user preferences. The processing unit may determine to record the user preferences in response to input received via the user interface 106. If so, the flow proceeds to block 208 where the user preferences are recorded in the non-transitory storage medium 105 before the flow proceeds to block 209. Otherwise, the flow proceeds directly to block 209.

At block 209, the processing unit 104 determines whether or not to switch to present content being received. The determination may include powering on of the content receiver, switching from presenting stored content to presenting content being received, or any other situation where the content receiver switches to present content being received from any operation where content being received is not presented. If so, the flow proceeds to block 210. Otherwise, the flow returns to block 202 and the content receiver 101 continues to operate.

At block 210, after the processing unit 104 determines whether or not to switch to present content being received, the processing unit selects a channel based on the channel selection information. The flow then proceeds to block 211 where the processing unit transmits content associated with the selected channel to the presentation device 103 via the output component 107. Next, the flow proceeds to block 212 where the processing unit records statistics regarding the content being accessed in the channel selection information stored in the non-transitory storage medium 105. The flow then returns to block 202 and the content receiver 101 continues to operate.

Although the method 200 is illustrated and described above as including particular operations arranged in a particular order, other operations arranged in other orders are possible without departing from the scope of the present disclosure. For example, operations 203, 205, 207, and 209 are illustrated and described above as being performed in a particular, sequential order. However, in other implementations these operations may be performed in different orders, one or more of these operations may not be performed, and/or one or more of these operations may be performed consecutively and/or in overlapping time periods.

Further, although operations of presenting stored or received content are not included in method 200, other than when switching to presenting received content, as illustrated and described above, it is understood that this is merely for the purposes of simplicity and clarity of example. The content receiver 101 may perform such operations. The fact that such operations are not illustrated or described above with respect to method 200 should not be understood to suggest that content receive 101 does not perform such operations.

Figure 3A:
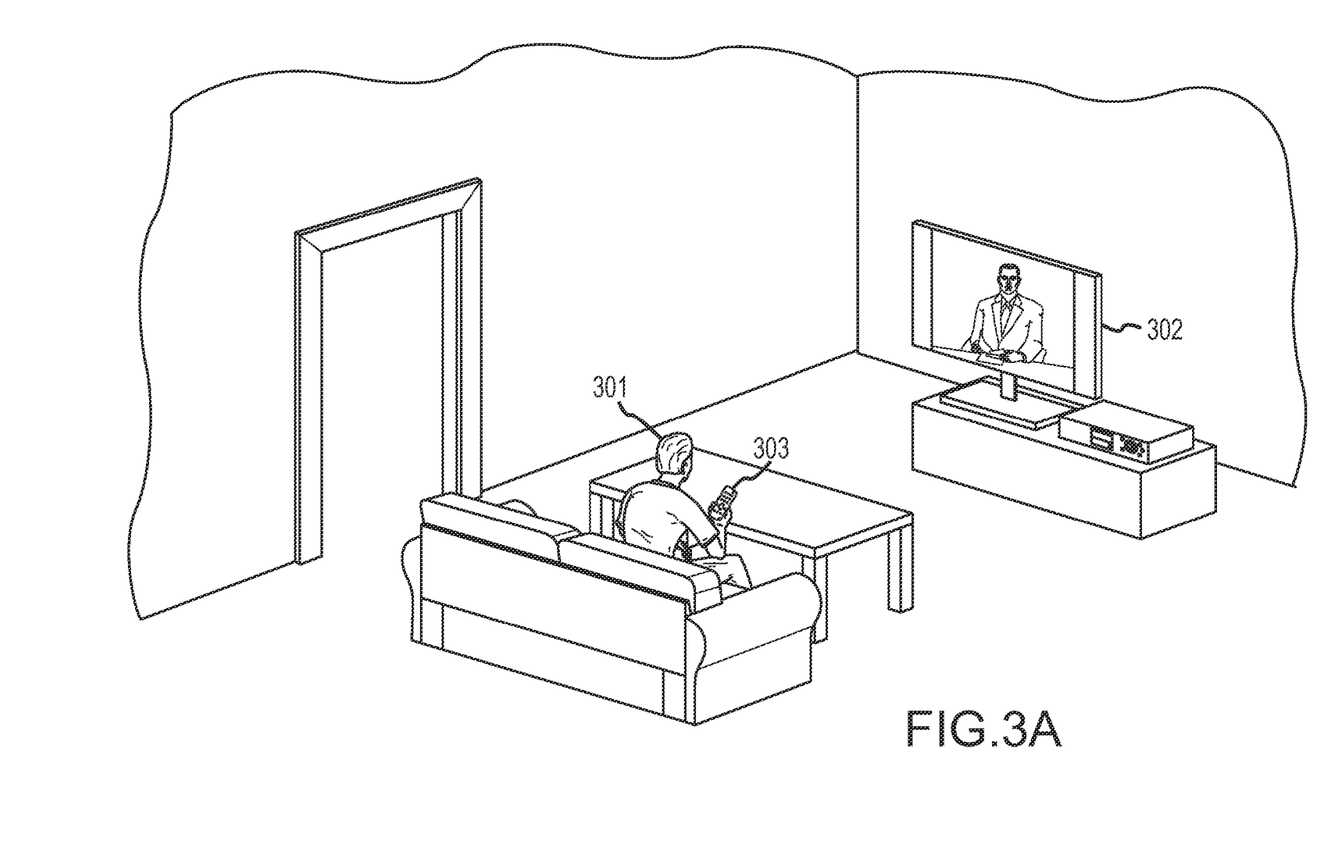
FIGS. 3A-3C are diagrams illustrating a user utilizing a system for smart channel tuning. The system may be the system of FIG. 1.
Figure 3B:
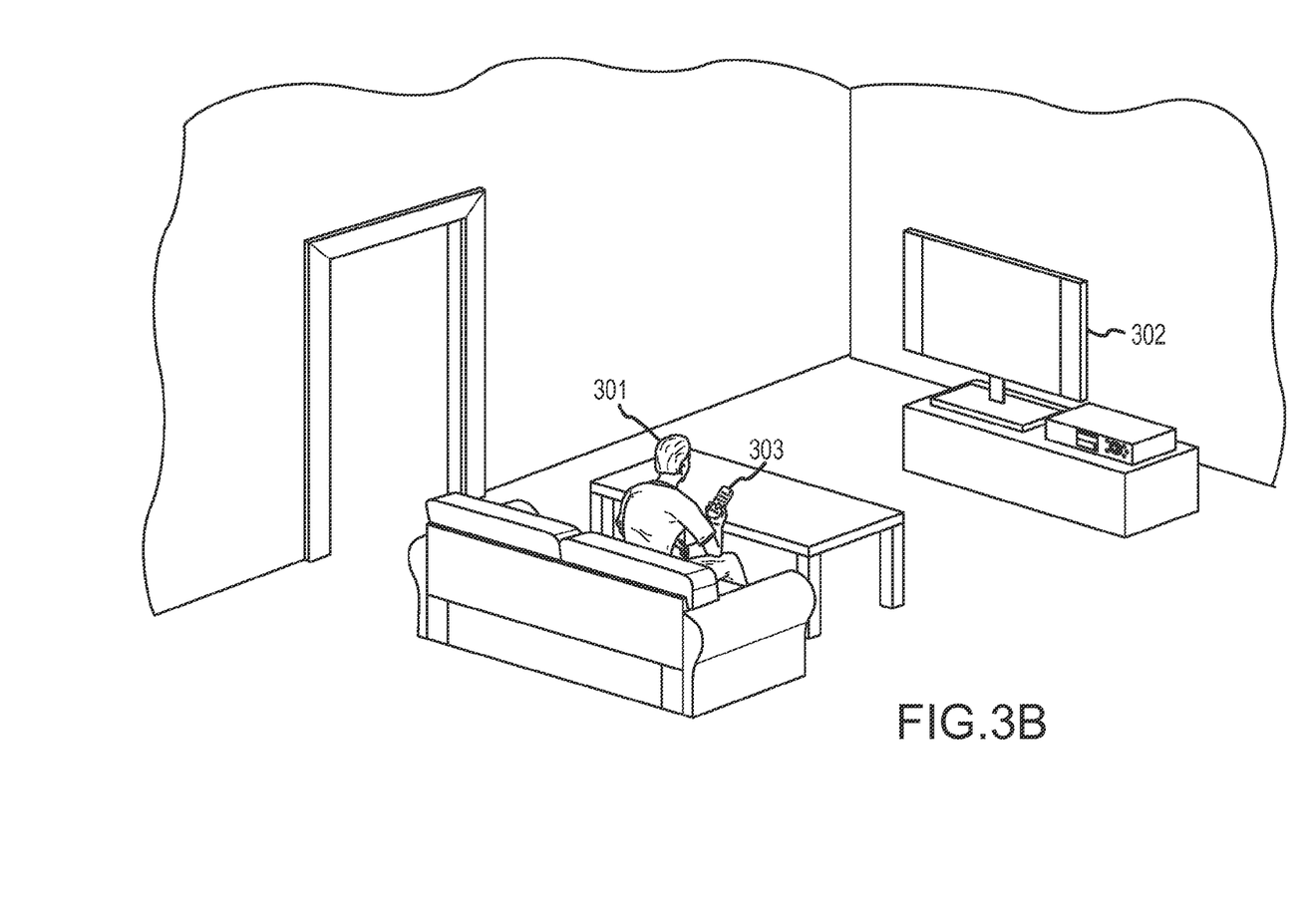
Figure 3C:
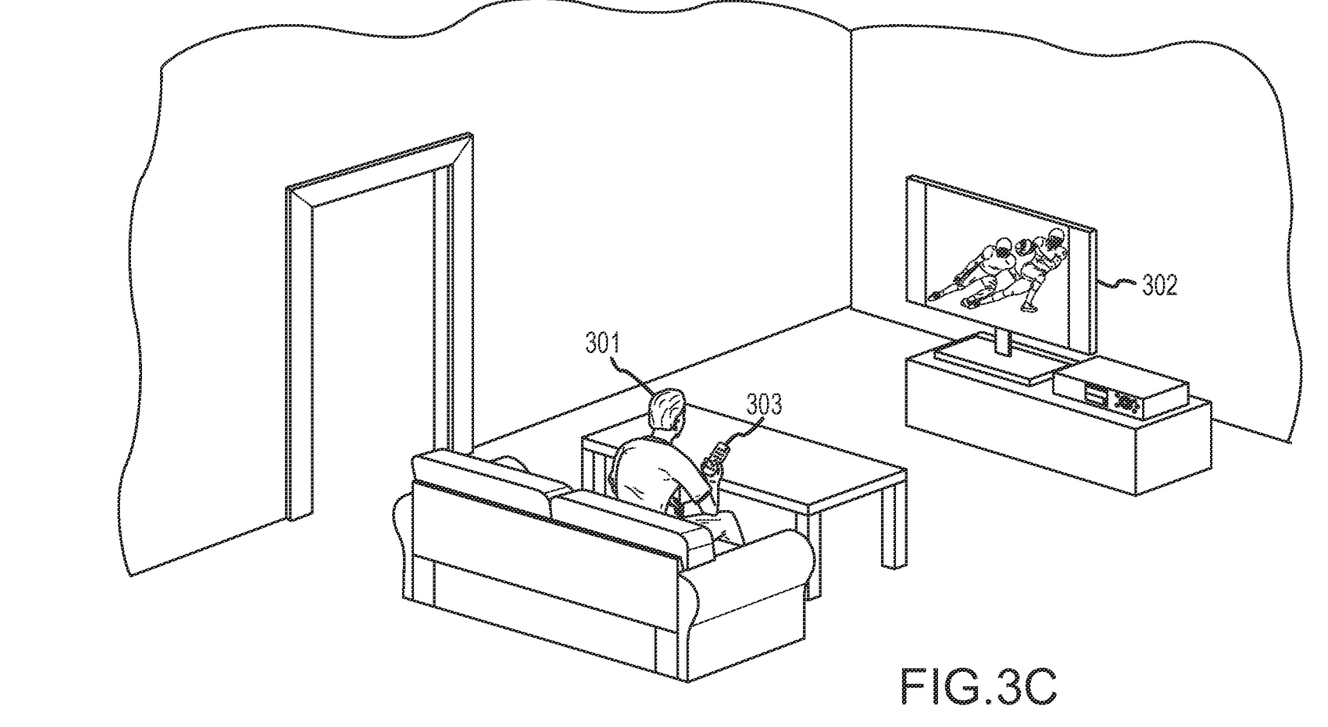

FIGS. 3A-3C illustrate a user 301 utilizing a system for smart channel tuning. As illustrated in FIG. 3A, the user 301 is watching a news program displayed by a television 302. The user then powers off the television utilizing a remote control 303, as illustrated in FIG. 3B. Next, the user powers on the television again utilizing the remote control.

In this example, the television 302 monitors programs accessed by the user 301 and records statistics regarding such in channel selection information stored in a non-transitory storage medium. Further in this example, the user regularly watches football games and the television records the characteristic of football game in the channel selection information. As such, when the television powers on, the television utilizes the channel selection information to select a channel that is associated with a football game. The television then displays the channel associated with the football game, as show in FIG. 3C.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method executable by a television content receiver to intelligently select a channel that is initially presented at the beginning of a television viewing session in which a viewer watches one or more television channels delivered by a content provider, the method comprising:
   prior to the beginning of the television viewing session, receiving channel selection related information from the content provider at the content receiver, wherein the channel selection related information describes television programming that is likely to be of interest to the viewer;
   automatically selecting, utilizing the content receiver, at least one channel of the plurality of channels for viewing at the beginning of the television viewing session based at least on the channel selection related information; and
   providing, utilizing the content receiver, at least one instance of content associated with the selected at least one channel to at least one presentation device at the beginning of the television viewing session using the at least one presentation device so that the viewer immediately views the television programming that is likely to be of interest at the outset of the television viewing session.

2. The method of claim 1, wherein the beginning of the television viewing session comprises at least one of:
   powering on the at least one presentation device, or
   switching the content receiver to presenting live content received from the at least content provider instead of previously-recorded content stored by the content receiver.

3. The method of claim 1, wherein said channel selection related information comprises at least on at least one of:
   a commonly accessed channel for at least a particular time period,
   a particular channel,
   a commonly accessed content characteristic wherein content associated with the at least one channel shares the commonly accessed content characteristic, or
   a particular content characteristic wherein content associated with the at least one channel shares the particular content characteristic.

4. The method of claim 1, wherein said providing comprises:
   determining content receiver access statistics by monitoring channels associated with instances of content accessed via the content receiver; and
   storing the content receiver access statistics.

5. The method of claim 4, further comprising transmitting the content receiver access statistics to the at least one content provider.

6. The method of claim 1, wherein the content provider obtains the at least one instance of channel selection related information by at least one of monitoring content accessed by a plurality of content receivers that receive content from the at least one content provider or receiving a sponsorship offer.

7. The method of claim 1, further comprising periodically receiving the at least one instance of channel selection related information from the at least one content provider.

8. The method of claim 1, further comprising receiving at least one user preference from a user of the content receiver.

9. The method of claim 1, wherein said operation of selecting, utilizing the content receiver, the at least one channel further comprises selecting the at least one channel based at least on a combination of at least two of information received from the at least one content provider, at least one user preference received from a user of the content receiver, or content receiver access statistics determined by monitoring channels associated with instances of content accessed via the content receiver.

10. A television content receiver, comprising:
    at least one communication component that receives a plurality of television channels from a content provider;
    at least one output interface; and
    at least one processing unit that determines to select at least one of the television channels for presentation to a viewer;
    wherein the at least one processing unit receives at least one instance of channel selection related information from the content provider prior to a beginning of a television viewing session in which the viewer watches one of more of the television channels, wherein the channel selection related information describes programming that is likely to be of interest to the viewer, and wherein the at least one processing unit automatically selects at least one channel of the plurality of channels for viewing at the beginning of the television viewing session based at least on the at least one instance of channel selection related information, and provides at least one instance of content of the plurality of instances of content that is associated with the selected at least one channel to the at least one presentation device via the at least one output device so that the selected channel is initially and immediately presented to the viewer by the at least one presentation device at the beginning of the television viewing session.

11. The content receiver of claim 10, wherein the at least one processing unit receives additional channel selection related information by receiving at least one user preference from a user of the content receiver via at least one user interface component.

12. The content receiver of claim 10, wherein the at least one processing unit receives the at least one instance of channel selection related information from the at least one content provider.

13. The content receiver of claim 12, wherein the at least one content provider obtains the at least one instance of channel selection related information by at least one of monitoring content accessed by a plurality of content receivers that receive content from the at least one content provider or receiving a sponsorship offer.

14. The content receiver of claim 12, wherein the at least one processing unit periodically receives the at least one instance of channel selection related information from the at least one content provider.

15. The content receiver of claim 10, wherein the at least one processing unit receives the at least one instance of channel selection related information by:
    determining content receiver access statistics by monitoring channels associated with instances of content accessed via the content receiver; and
    storing the content receiver access statistics in at least one non-transitory storage medium.

16. The content receiver of claim 15, wherein the at least one processing unit transmits the content receiver access statistics to the at least one content provider via the at least one communication component.

17. The content receiver of claim 10, wherein the at least one processing unit selects the at least one channel of the plurality of channels based at least on a combination of at least two of:

information received from the at least one content provider,
at least one user preference received from a user of the content receiver, or
content receiver access statistics determined by monitoring channels associated with instances of content accessed via the content receiver.

18. The content receiver of claim 10, wherein the beginning of the television viewing session comprises at least one of:
powering on the at least one presentation device, or
switching the content receiver to presenting live content received from the at least content provider instead of previously-recorded content stored by the content receiver.

19. The content receiver of claim 10, wherein the at least one processing unit selects the at least one channel of the plurality of channels based at least on at least one of:
a commonly accessed channel for at least a particular time period indicated by the channel selection related information,
a particular channel specified by the channel selection related information,
a commonly accessed content characteristic indicated by the channel selection related information wherein content associated with the at least one channel shares the commonly accessed content characteristic, or
a particular content characteristic specified by the channel selection related information wherein content associated with the at least one channel shares the particular content characteristic.

* * * * *